United States Patent
LeBlanc et al.

(10) Patent No.: US 6,694,506 B1
(45) Date of Patent: Feb. 17, 2004

(54) OBJECT ORIENTED PROGRAMMING SYSTEM WITH OBJECTS FOR DYNAMICALLY CONNECTING FUNCTIONING PROGRAMMING OBJECTS WITH OBJECTS FOR GENERAL PURPOSE OPERATIONS

(75) Inventors: Karalee Brown LeBlanc, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 08/951,937

(22) Filed: Oct. 16, 1997

(51) Int. Cl.$^7$ ................................. G06F 9/44
(52) U.S. Cl. ................ 717/108; 717/109; 717/114; 717/116; 717/111; 707/1; 709/332
(58) Field of Search ................ 395/702, 701, 395/500; 717/2

(56) References Cited

U.S. PATENT DOCUMENTS

| | | | | |
|---|---|---|---|---|
| 5,551,055 A | | 8/1996 | Matheny et al. | 395/882 |
| 5,574,898 A | | 11/1996 | Leblang et al. | 707/1 |
| 5,680,619 A | * | 10/1997 | Gudmundson et al. | 395/701 |
| 5,774,689 A | * | 6/1998 | Curtis et al. | 395/500 |
| 5,794,038 A | * | 8/1998 | Stutz et al. | 395/683 |
| 5,872,973 A | * | 2/1999 | Mitchell et al. | 395/702 |

* cited by examiner

Primary Examiner—Chameli C. Das
(74) Attorney, Agent, or Firm—David A. Mims, Jr.; J. B. Kraft

(57) ABSTRACT

A computer controlled object oriented programming system for distributive program development over networks such as the internet with implement for interfacing a plurality of programming objects with each other to provide combination objects combining programming functions of said objects, each object including predetermined interface data defining a required common interface with the other programming objects as well as a framework of events and attributes and methods for manipulating the attributes. These objects may be combined with each other via their common interfaces to form combination objects, and such combination objects may in turn be further combined with other objects and combination objects to form objects of increasing complexity which function as complete programs. General purpose operations and functions are added to existent object oriented programs in an object attribute independent process. Also, this addition may be done dynamically to such existent programs. There is provided a connecting object interfacing between the original object or program being modified and a new program object which provided the upgrading operations. This connecting object includes implement for detecting the occurrence of at least one selected condition in said original object, and implement responsive to said detecting implement for notifying the new object of said occurrence. The connecting object functions independently of the attributes and methods contained in the original object.

16 Claims, 5 Drawing Sheets

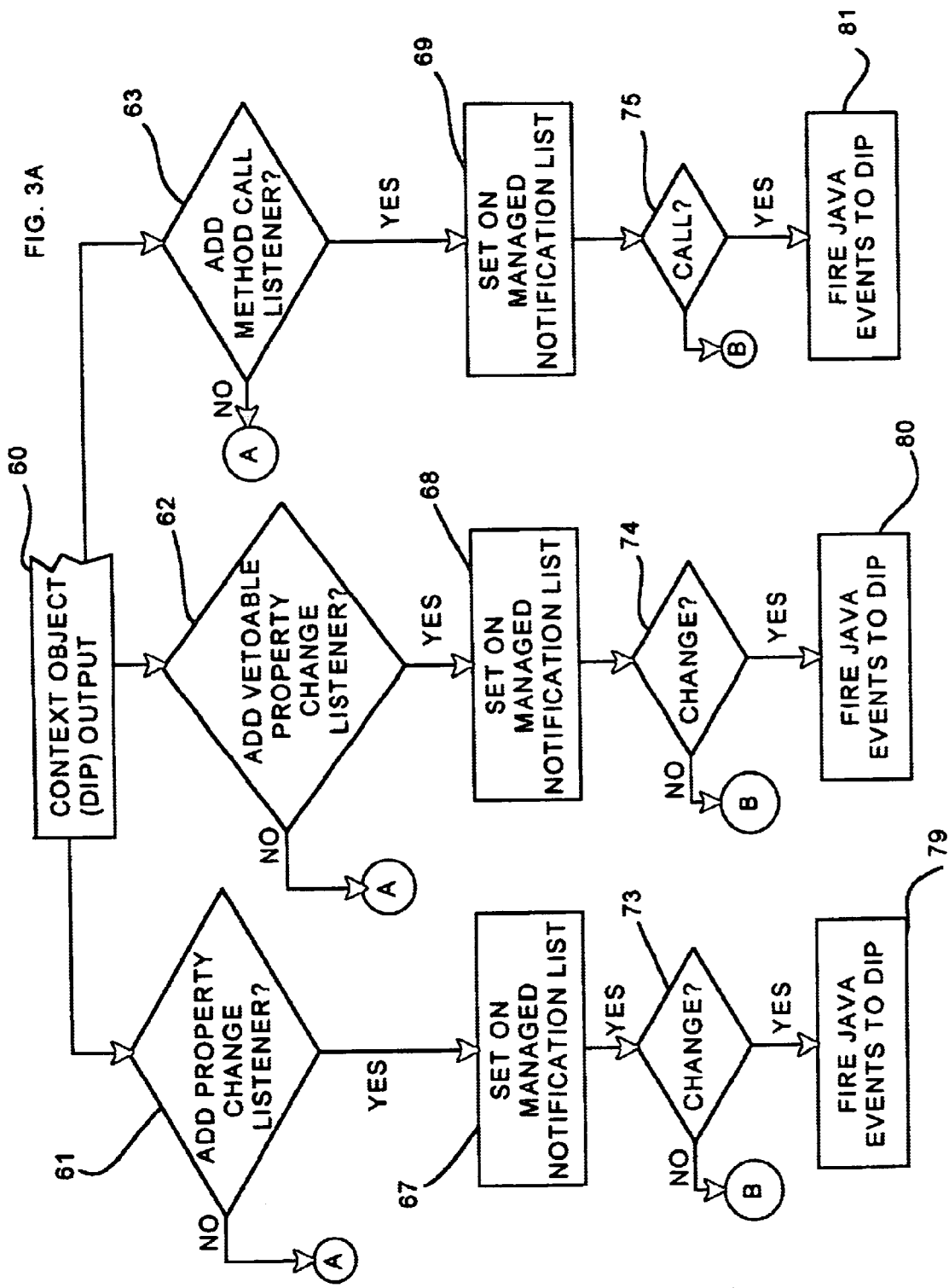

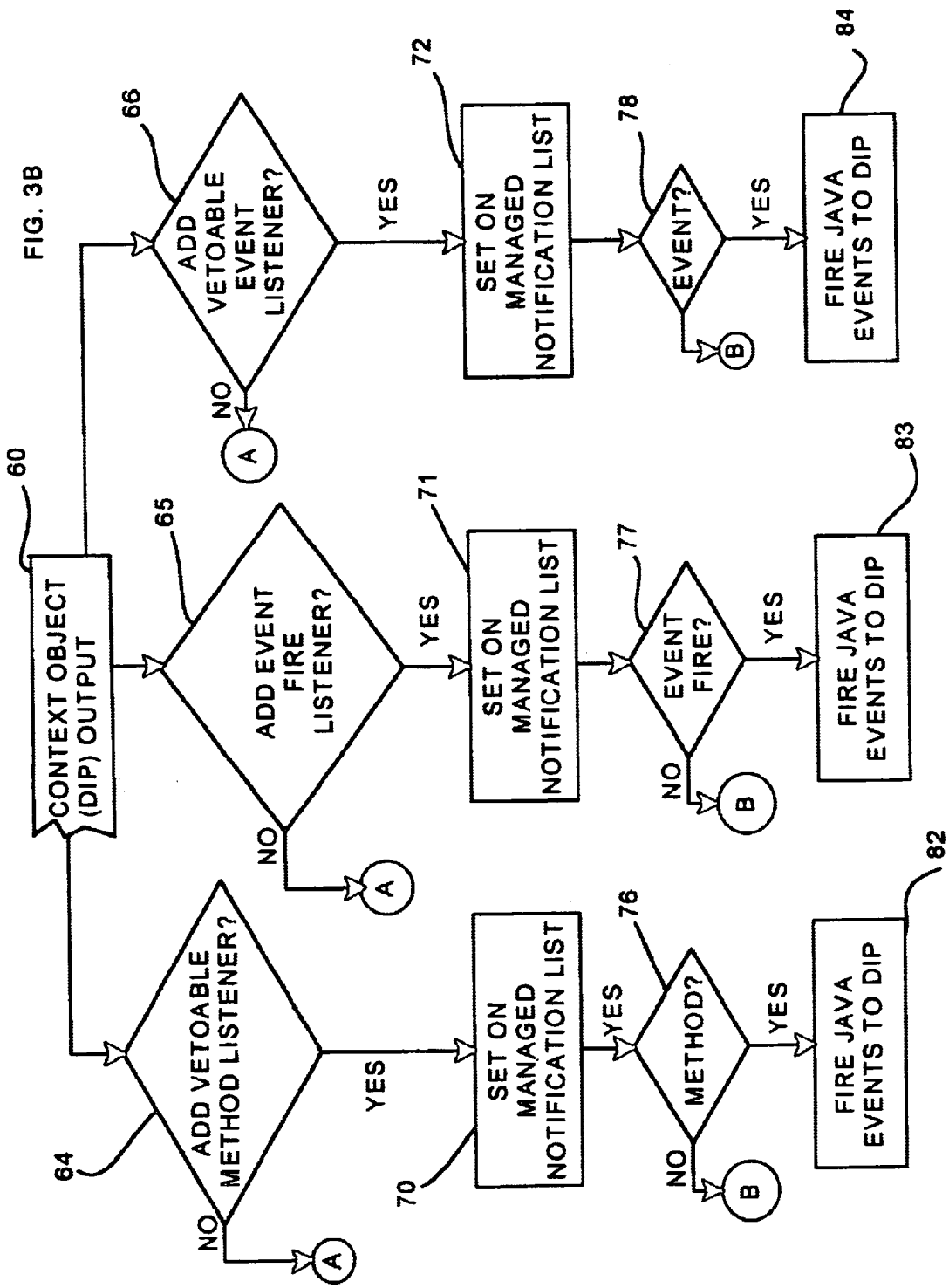

OBJECT ORIENTED PROGRAMMING SYSTEM WITH OBJECTS FOR DYNAMICALLY CONNECTING FUNCTIONING PROGRAMMING OBJECTS WITH OBJECTS FOR GENERAL PURPOSE OPERATIONS

CROSS-REFERENCE TO RELATED COPENDING PATENT APPLICATIONS

The following patent application which has the same inventorship as the present invention and is assigned to a common assignee covers subject matter related to the subject matter of the present invention: "AN OBJECT ORIENTED DISTRIBUTED PROGRAMMING SYSTEM FOR COMPUTER CONTROLLED NETWORKS WITH SELECTIVE CAPTURE OF PROGRAM PROPERTY DATA IDENTIFYING A PARTICULAR PROGRAM VERSION", Otto Fox, Ser. No. 08/954,650.

TECHNICAL FIELD

The present invention relates to user-interactive object-oriented programming systems and particularly to such object-oriented programming systems which systems would be available to both programmers and interactive users in a networking environment such as the internet or equivalent proprietary or public networks.

BACKGROUND OF THE INVENTION

The 1990's decade has been marked by a societal technological revolution driven by the convergence of the data processing industry with the consumer electronics industry. Like all such revolutions, it unleased a great ripple effect of technological waves. The effect has in turn driven technologies which have been known and available but relatively quiescent over the years. Two of these technologies are the internet-related distribution and object-oriented programming systems. Both of these technologies are embodied in the object-oriented JAVA Programming system. The computer and communications industries have extensively participating in the development and continual upgrading of the Java system. For details and background with respect to the Java system, reference may be made to a typical text, "Just JAVA", 2nd Edition, Peter van der Linden, Sun Microsystems, 1997. The convergence of the electronic entertainment and consumer industries with data processing exponentially accelerated the demand for wide ranging communications distribution channels and the World Wide Web or internet which had quietly existed for over a generation as an loose academic and government data distribution facility reached "critical mass" and commenced a period of phenomenal expansion which has not as yet abated.

With the expanded accessibility of tens of thousands of programmers to each other, not to mention to potential users of such programs via the expanded internet client base, an obvious need became apparent: cooperative programming systems wherein program developers could coact to continuously expand and enhance existing programs in a distributed programming environment. Also, users could readily obtain and apply these developed programs. Object-oriented programming which also had been virtually languishing for a generation offered the solution. With its potentially interchangeable objects or units within which both data attributes and functions were stored in a predefined uniform framework as well as the predefined object interfaces with each other, object-oriented programming systems have found acceptance as the programming system for the internet. In all areas of the data processing, communications as well as the electronic entertainment and consumer industries having anything to do with the internet, there has been a substantial movement to Java, the Sun Microsystems originated object-oriented programming system.

While the above described advantages of object-oriented programming with respect to the collective and cooperative programming are clear, there are potential disadvantages in a programming system where literally thousands of program developers and users are continually making changes in the programs dynamically. These changes generally involve changes in the data attributes, i.e., changes in the properties of the subject matter represented by the data in the object or in the methods of handling data, also stored in the object.

It often happens that after an object oriented program has been dispensed and distributed widely via networks or otherwise, a need arises to add general purpose operations or functions to the program. While it has been conventionally possible to add such operations to programs prior to distribution, the object oriented programming technology has not been able to develop any convenient process whereby the new function could be added to the dispensed and distributed programs since a great many of these distributed would have had their attributes or methods changed by users "down the line". The present invention provides a solution by providing a means of adding general purpose operations and functions to existent object oriented programs which is object attribute independent. Also, this addition may be done dynamically to such existent programs.

SUMMARY OF THE INVENTION

The present invention relates to a computer controlled object oriented programming system having means for interfacing a plurality of programming objects with each other to provide combination objects combining programming functions of said objects in which each object includes predetermined interface data defining a required common interface with the other programming objects. A plurality of these objects, each have a framework comprising a plurality of data attributes and a method of manipulating said data attributes. These objects may be combined with each other via their common interfaces to form combination objects, and such combination objects may in turn be further combined with other objects and combination objects to form objects of increasing complexity which function as object oriented programs.

The present invention provides for the connecting of a new program object to an existing object which may vary in complexity from an initial object to a more complex object such as a combination object embodying a whole operative program. It provides a connecting object interfacing between the original object being connected to and the new program object. This connecting object includes means for detecting the occurrence of at least one selected condition in said original object, and means responsive to said detecting means for notifying the new object of said occurrence. The connecting object functions independently of the attributes and methods contained in the original object.

This new program object being connected performs general purpose operations with respect to the original object; it responds to the notification to perform functions in such operations. In addition, this new program object has the means which select of the selected conditions in the original object being responded to and also means for notifying the connecting object of the selection.

Before describing additional aspects of the invention, a brief explanation of "events" in object oriented programming is deemed appropriate. In general, an "event" is the input of an action usually outside of the object to which the object may respond, e.g., a user interactive click of a button, mouse movement or key input. The object program being added to may be sufficiently sophisticated to have its own event handler object or the event data may just be directly stored. In any event, the original object being connected to may have some data which is event related. Thus, the selected condition in this original being responded to may involve event data in addition to data attribute changes or the object's methods.

BRIEF DESCRIPTION OF THE DRAWINGS

FIG. 3 is a flowchart describing operations in which the connecting object of the present invention functions as an interface between the object program being modified and the upgrading or context object.

DETAILED DESCRIPTION OF THE PREFERRED EMBODIMENTS

Figure 1:
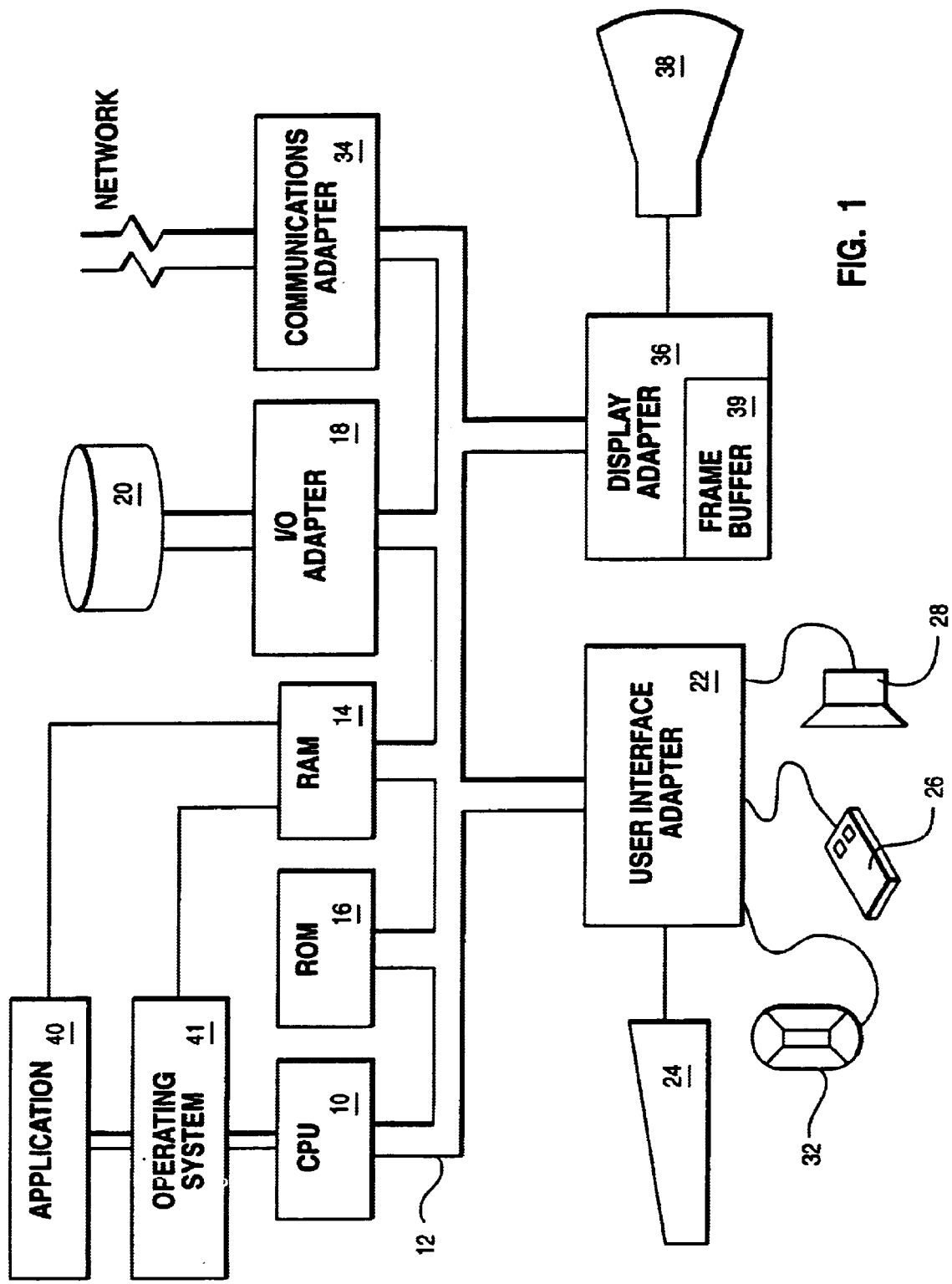
FIG. 1 is a block diagram of a data processing system including a central processing unit and network connections via a communications adapter which is capable of implementing the present invention.

Before going into the details of specific embodiments, it will be helpful to understand from a more general perspective the various elements and methods which may be used to implement the present invention. The present invention is implemented using the Java Programming system which is an object-oriented system utilizing the Java programming language. The Java system and language are extensively familiar to those skilled in the art. The text, "Just JAVA", Peter van der Linden, described above comprehensively details the system and language. Nonetheless, it should be helpful to generally review the known principles of object-oriented programming.

It should be understood by those skilled in the art that object oriented programming techniques involve the definition, creation, use and instruction of "objects". These objects are software entities comprising data elements or attributes and methods, which manipulate the data elements. Objects may also include data related to events outside of the object to trigger or control methods within the object. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a construct-or which uses the corresponding class definition and additional information, such as arguments provided during object creation, to construct the object. Objects are destroyed by a special function called a destruct-or.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an object may have format of attribute data and methods to support a geometric shape The same format can be used whether the shape is a rectangle or a circle. However, the actual program code which performs the shape formation may differ widely depending on the type of variables which comprise the shape. After the methods have been defined, a program can later refer to the shape formation method by its common format and, during compilation, the compiler will determine which of the shaping methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such pre-defined classes are typically called "frameworks" and essentially provide a prefabricated structure as a basis for creating a working application program.

In object oriented programming such as the previously described Java system, there is provided for the developer a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

A clarification of the term "framework" as used in object-oriented programming is in order. Frameworks are pre-defined structures for objects, combinations of objects which form more extensive objects and eventually combinations which provide whole programs.

Referring to FIG. 1, a typical data processing system is shown which may be used in conjunction with object oriented software such as JAVA (TM of Sun Microsystems Inc.) in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). An object oriented programming system such as Java 40 runs in conjunction with operating system 41 and provides output calls to the operating system 41 which implements the various functions to be performed by the application 40. The Java Programming System in combination with the operating system provides the basic platform with which, software developers will develop and end users will use the object oriented software of this invention.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the Java application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) which includes of course the internet for which Java created. I/O devices are also connected to system bus 12 via user interface adapter 22 and display adapter 36. Keyboard 24, trackball 32 and mouse 26 are all interconnected to bus 12 through user interface adapter 22. Event data may be input to the object oriented programming system through any of these devices. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting event data and other information to the system through the keyboard 24, trackball 32 or mouse 26 and receiving output information from the system via display 38.

Since the present invention is implemented in the JAVA object oriented programming system, some initial comments concerning object oriented programming principles as embodied in JAVA should be appropriate. Since object oriented programming systems have been rapidly developing in recent years including systems and languages other than JAVA, there is still an absence of universality in the terminology which is being used in the art to describe various object oriented programming functions. It will be understood by those skilled in the art that other terms may have been used to describe the principles which we will discuss herein. As set forth in the above mentioned references, JAVA is a fully object oriented programming system which operates on a basic operating system such as Windows or OS/2. JAVA includes a wealth of frameworks, class libraries and a new programming environment intended to greatly enhance application software development, on the internet. It is intended to be fully portable between operating systems. There is a defined commonality between users factored into a set of services and frameworks. In JAVA, as in all highly sophisticated object oriented systems, writing an application program means creating a set of linked objects integrated into the JAVA/operating system platform. Software developers rely on this platform for both a sophisticated set of services and a framework to develop software. The frameworks provide powerful abstractions which permit software developers to concentrate on their problem rather that building up infrastructure. Furthermore the abstractions for the software developer are very close to the fundamental concepts that a user must understand to operate his software. All this makes the development of application easier.

An embodiment of the present invention will described which uses the "JAVA Bean" (TM of Sun Microsystems Inc.) API (application programmer's interface). JAVA Bean is the most extensively used API in JAVA Programming. It is the tool which provides application developers with the framework for reusable, embeddable modular software components. The bean is the basic object unit; it can range from a simple individual component object to a extensive combination of objects providing a whole application program. JAVA Beans and their common properties and functions are described in detail in the text, "JAVA in a Nut Shell, 2nd. Edition by David Flanagan, published by O'Reilly and Assoc. Inc., California, 1997, particularly Chapter 10, pp. 178–189. The goal of the JAVA Bean Model is its commonality and interoperability with other Beans to form a combination component or Bean. Beans have defined common interfaces. Thus when beans are connectable via their common interfaces, the interfacing Beans may export to each other: 1) properties or attributes, 2) events and 3) methods. An attribute is a piece of the Bean's internal state which can be set and queried, usually though a standard pair of get and set accessor methods. A Bean may generate events through the triggering of a standard visible defined screen object such as a button. A Bean defines an event if it provides methods for adding or removing listener objects, for example, from a list of interested listeners for that event. Finally, the methods exported by the Bean are any public methods defined by the Bean, except for the Bean's own "housekeeping" methods which are used to get and set attribute values and to register and remove listeners in the above example.

We, thus, have a programming environment where a wide variety of JAVA Beans are available to a great many program developers as well as to an almost infinite number of users who now have the power to write their own or at least modify programs involving combinations of objects or Beans. As stated earlier, the embodiment of the present invention will describe in terms of the Java programming system, how new general purpose operations in the form of objects or Beans may be connected to existing and operative JAVA Bean Programs. This may involve, for example, connecting a version object or Bean as set forth in the above mentioned Otis Fox patent application which when connected to an existent programming object provides a general purpose object for recording selected versions of the original programming object triggered by selected conditions. Also, as will be described hereinafter in greater detail, the general purpose object connected could be a security object which would add a security layer dynamically to an existent object oriented program.

As will be seen from the description hereinafter of the flowcharts, the means and method for detecting the conditions triggering operating functions in the added general purpose operations bean or layer are included in the connecting layer or object of this invention. The layer for performing the general purpose operations will be referred to as a context layer or object. In the above mentioned copending application, the context layer is referred to as a "Dip". This context object as well as the connecting object of this invention, both have the required Bean or object common interface which permits these objects or layers to interface with the object or Bean in the JAVA system and also serves the common interface function when the Bean with these layers in turn interfaces with other Beans or with the JAVA/selected operating system platform. Thus the connecting and context layers would appear to be transparent when a Bean with the layers interfaces with another object. In this sense both the connecting and context layers may be considered to be objects which do not have the standard attribute handling of conventional Beans but rather perform "housekeeping" or administrative-like functions for the system. In other words, they are attribute independent. As a result, program developers who wish to add a context layer or "dip" do not have to do anything out of the ordinary or have a prior knowledge of the connecting layer interfaces when they write their object.

Figure 2:
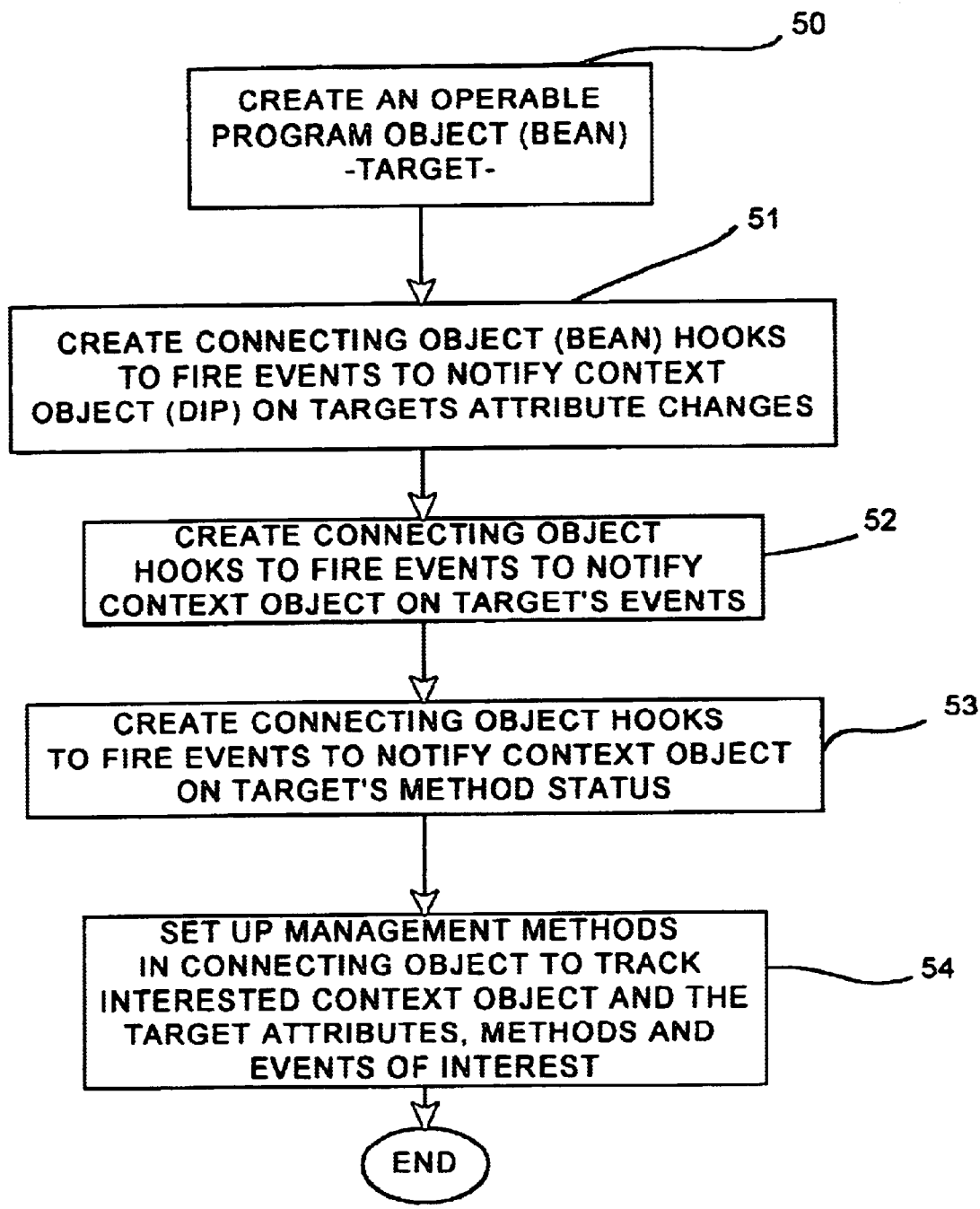
FIG. 2 is a flowchart describing the steps involved in developing a connecting object in accordance with present invention.
Figure 4:
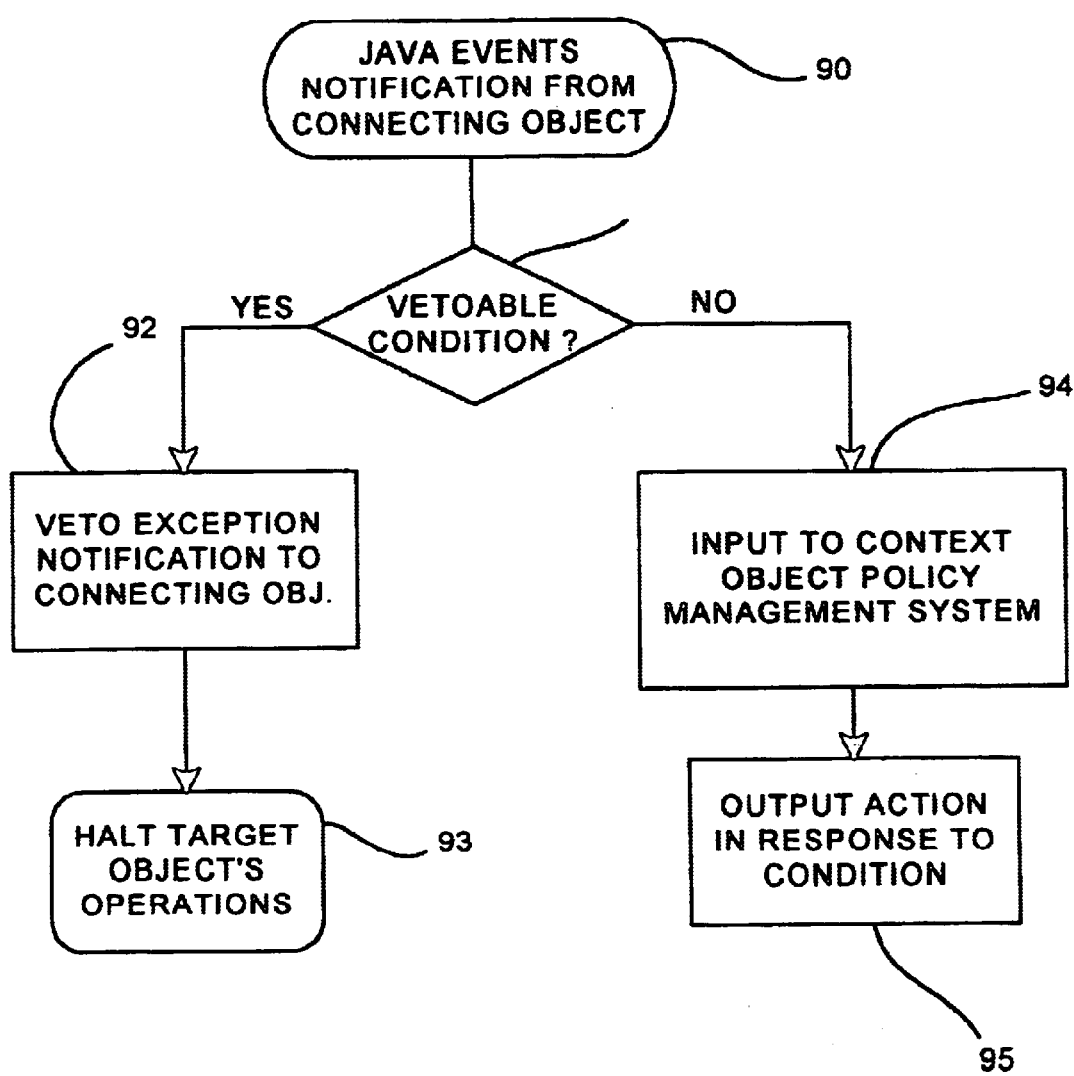
FIG. 4 is a flowchart showing how the operations of FIG. 3 handle the sensing of a vetoable condition in the object being modified.

The present invention will now be described with respect to the flowcharts of FIGS. 2 through 4. In the example of the invention embodiment, Java Bean language, code and principles will be used. These are fully described in the previously referenced text, "Java in a Nutshell", David Flanagan. FIG. 2 is a chart showing the development of the connecting programming object of the present inventions, its functions with respect to an interfacing object, the JAVA Bean to connect the Bean to a context object which acts to perform general purpose operations on the basic or target object. Step 50: using JAVA Bean programming, an object is created. The Bean which will be referred as the target object contains the events, attributes and methods required by the Bean definition in a predefined Bean framework with a Bean interface common to all Beans and thus is combinable with other Beans via this common interface. When Beans combine with other Beans, they form combination beans which may be more complex than the original Beans but they fit the basic Bean definition and framework set forth above, even when the combination may be a whole routine or even a program. Step 51, hooks are created in the connecting object of this invention which will fire events to notify interested objects, i.e., "Dips" with respect to target object attribute or property changes which the respective Dip has requested to be monitored. Similarly, step 52, hooks are created which fire events to notify interested Dips in response the target object's own events and in step 53, hooks are created which fire events to notify interested Dips in response the target object's changes in status of its methods. The creation of such hooks includes receiving from the context objects or dips, the various target object properties, methods and events of interest to the dips and activating appropriate object fire events to notify the dips and to set the FireEvents triggers.

In step 54, a management system is set up for keeping track of all interested context objects, i.e., dips as well as the target object properties, methods and events that the respective dips are interested in. This covers the development of the program of the present invention.

Now, with respect to FIG. 3, we will describe an example of the operation of the program of this invention. The example will show the procedures with respect to a single Dip or context layer. It should be understood that the invention is equally operable when multiple dips are used on a target Bean or object. However if multiple dips are used, there may arise incompatibilities between Dips which would interfere with either the operations of the target Beans or some of the operations in the Dips. Accordingly, it should be understood that if additional Dips are to be added to a target Bean which has already been Dipped, an initial determination of compatibility should be made before a next Dip is added.

In the procedure of FIG. 3, the context object or Dip requires data as to the status of properties (attributes), the status of methods and the status of events relative to the target object or Bean. The Dip in step 60 sends an output which may request the addition of any combination of the following: a property change listener, as determined by step 61; a vetoable property change listener as determined by step 62; a method call listener as determined by step 63; a vetoable method listener as determined by step 64; an event fire listener as determined by step 65; and a vetoable event listener as determined by step 66. In each of the above determinations, where a listener is to be added and the respective decision from any or all of steps 61 through 66 is Yes, the process respectively moves to any or all steps 67 through 72 and a setting is made on the managed attribute, method and event notification list relative to the target object but managed in the connecting object to listen for the selected conditions. In the case of no decisions from any of steps 61 through 66, then the respective output goes to a quiescent status as indicated by branches "A" and awaits the next input from context object 60.

The respective conditions set on the notification list, steps 67 to 72 in turn are listened for respectively by decision steps 73 to 78. A "Yes" decision in any of these steps results in the firing of the corresponding "FireJavaEvents" back to the Dip, steps 79 to 84, where such data is then used by this context object in the general purpose operation which it is performing with respect to the target object. Such operations may give rise to further output from the context object, 60 back to the connecting object as previously described. If the conditions being listened for in decision steps 73 to 78 do not occur in the respective step as represented by a "No" output, the respective steps remain in the listening stage for the conditions being monitored, indicated by branches "B".

At this point, we will consider how the programming system handles a vetoable condition such as those monitored in FIG. 3: vetoable property change; vetoable method or vetoable event. Where such a vetoable condition arises, it may that the context object or Dip can no longer routinely perform its functions or that the operations in the context object require the target object to be shut down. FIG. 4 shows how such vetoable condition occurrences are handled by the system. When the JavaEvents notification reaches the context layer or Dip, step 90, from the connecting layer, decision step 91 decides whether the condition is a vetoable one, if "No", then step 94, it is input to the Dip's operations managed by a management policy which may output a appropriate action in response, step 95. If the condition is a vetoable one, then the "Yes" output results in a veto exception notification, step 92, to the connecting object and step 93, the target object's operations are halted. At this point the system may perform specified actions to take place via programming routines in the system or user interactively to offset the vetoable condition so that the operation may be resumed.

It is in this manner that the connecting object of the present invention functions to transparently connect a general purpose operations layer to any appropriate basic object in an object oriented programming system. The present invention is particularly effective in providing a vehicle whereby object oriented programs which have been extensively deployed among users may be upgraded seamlessly to include attribute independent general purpose functions and operations.

Although certain preferred embodiments have been shown and described, it will be understood that many changes and modifications may be made therein without departing from the scope and intent of the appended claims.

What is claimed is:

1. In a computer controlled object oriented programming system having means for interfacing a plurality of programming objects wherein said programming objects may be initial programming objects and combinations of such initial programming objects combining functions of said initial objects, and each programming object including data attributes, methods of manipulating such attributes and predetermined interface data defining a required common interface with the other programming objects, the improvement wherein said system further comprises:

at least one connecting object without data attributes and interfacing with at least one of said programming objects including,
      means for detecting the occurrence of at least one selected condition in said one object, and
      means responsive to said detecting means for notifying a second object also interfacing with said connecting object of said occurrence.

2. The object oriented programming system of claim 1 further including said second object wherein said second object has means responsive to said notification for performing general purpose operations with respect to said one object.

3. The object oriented programming system of claim 2 wherein said second object further includes means for selecting said selected condition.

4. The object oriented programming system of claim 3 wherein said second object further includes means for notifying said connecting object of said selected condition.

5. The object oriented programming system of claim 1 wherein said one object further includes data related to events.

6. The object oriented programming system of claim 5 wherein said selected condition may involve said event data, said data attributes or said methods of manipulating said data attributes.

7. In a computer method of object oriented programming including interfacing a plurality of programming objects wherein said programming objects may be initial programming objects and combinations of such initial programming objects combining functions of said initial objects, and each programming object including data attributes, methods of manipulating such attributes and predetermined interface data defining a required common interface with the other programming objects, a connecting object without data attributes providing a method for connecting at least one of said programming objects to an object for performing general purpose operations on said one object through an intermediate connecting object without data attributes comprising
      detecting the occurrence of at least one selected condition in said one object, and
      responsive to the detection of said selected condition, notifying said general purpose operations object of said occurrence.

8. The method of claim 7 further including the steps of selecting said selected condition based on data from said general purpose operations object and notifying said one object of said selection.

9. The method of claim 7 wherein said one object further includes data related to events.

10. The method of claim 9 wherein said selected condition may involve said event data, the data attributes or the methods of manipulating said data attributes in said one object.

11. A computer program operable in a computer controlled object oriented programming system having means for interfacing a plurality of programming objects wherein said programming objects may be initial programming objects and combinations of such initial programming objects combining functions of said initial objects, and each programming object including data attributes, methods of manipulating such attributes and predetermined interface data defining a required common interface with the other programming objects, having:

data structures included on a computer readable medium comprising:
      at least one connecting object without data attributes for interfacing with at least one of said programming system objects including,
         means for detecting the occurrence of at least one selected condition in said one object, and
         means responsive to said detecting means for notifying a second object also interfacing with said connecting object of said occurrence.

12. The computer program according to claim 11 further including said second object and wherein said second object has means responsive to said notification for performing general purpose operations with respect to said one object.

13. The computer program according to claim 12 wherein said second object further includes means for selecting said selected condition.

14. The computer program according to claim 13 wherein said second object further includes means for notifying said connecting object of said selected condition.

15. The computer program according to claim 11 wherein said one object further includes data related to events.

16. The computer program according to claim 15 wherein said selected condition may involve said event data, said data attributes or said methods of manipulating said data attributes.

* * * * *